United States Patent [19]
Rau et al.

[11] 3,805,089
[45] Apr. 16, 1974

[54] DIGITAL ACCELERATION MEASUREMENT DEVICE

[75] Inventors: James E. Rau; Rogell Van Wyk, both of Anaheim; George A. Watson, Tustin, all of Calif.

[73] Assignee: Rockwell International Corporation, El Segundo, Calif.

[22] Filed: Dec. 26, 1972

[21] Appl. No.: 317,993

[52] U.S. Cl............... 307/233, 307/221 R, 328/37, 328/48, 328/127, 328/134, 328/140, 340/262
[51] Int. Cl............................................ H03k 5/18
[58] Field of Search....... 328/127, 37, 48, 134, 140; 307/229, 233, 221 R, 225 R; 340/262

[56] References Cited
UNITED STATES PATENTS

| | | | |
|---|---|---|---|
| 3,543,170 | 11/1970 | Diederich | 328/127 X |
| 3,550,018 | 12/1970 | James et al. | 328/127 |
| 3,609,563 | 9/1971 | Zinn et al. | 307/233 X |
| 3,611,109 | 10/1971 | Jones | 307/233 X |
| 3,732,437 | 5/1973 | Sharp | 307/233 |
| 3,723,764 | 3/1973 | Sharp | 307/233 |

Primary Examiner—Rudolph V. Rolineck
Assistant Examiner—William D. Larkins
Attorney, Agent, or Firm—L. Lee Humphries; H. Frederick Hamann; Rolf M. Pitts

[57] ABSTRACT

Digital acceleration sensor comprising pulse rate responsive means for determining the rate of change of a detected variable pulse rate, the pulse rate representing a velocity state or rate of change of interest.

9 Claims, 4 Drawing Figures

DIGITAL ACCELERATION MEASUREMENT DEVICE

BACKGROUND OF THE INVENTION

In the design of anti-skid control devices for braked vehicles and the like, the rotational velocity and acceleration states of the braked wheels of the vehicle are employed to determine the braked state of the braked vehicle. Such acceleration state is derived from angular velocity data which, in turn, may be deduced from devices such as magnetic pick-off elements known in the art per se for providing an induced electrical pulse rate output indicative of the sensed angular velocity state. The associated angular acceleration, if any, may be determined as the time rate of change of the detected pulse rate by straight forward analog or digital differential techniques, as are well understood in the art.

Digital differentiation techniques are normally preferable over analog differentiating techniques because the effects of differentiated noise tend to be less troublesome than for analog devices. Also, the digital format of the data may be directly employed by reliable high speed digital process controllers without the necessity of format conversion or analog-to-digital converters. Devices for the determination of angular acceleration from a detected pulse rate corresponding to a velocity state of interest is described in U.S. Pat. No. 3,522,973 to Klein. By means of such device, magnetic or other rotatable wheel responsive means is employed to generate pulses indicative of wheel rotation, the number of events-per-unit-time (EPUT's) or pulses measured over successive like intervals are taken as analogs of average velocity, averaged over such interval; while the difference between the number of pulses for successive intervals is deemed indicative of the acceleration or time rate of change of such velocity averaged over such two successive intervals.

A limitation in the performance of devices for determining the rate-of-change of events-per-unit-time (or determining acceleration from digital differentiation of a velocity-indicative pulse rate) is that the resolution limits of the acceleration determination worsen at low acceleration and low velocity limits due to the angular resolution limits in the sensed pulse train from which the velocity and acceleration measurements are made. Thus, the combinations of velocity and acceleration necessary to test for braking criterion in an anti-skid control system cannot be determined with a desired degree of certainty.

BRIEF DESCRIPTION OF THE INVENTION

By means of the concept of the subject invention the above-noted shortcomings of the prior art are sought to be avoided and there is provided improved pulse rate responsive means for determining the rate of change of the pulse rate as a measure of a selected acceleration state and having improved resolution limits.

In a preferred embodiment of the invention there is provided a first, second and third clocked register, the first and third registers being commonly adapted to be clocked by a detected pulse rate and the third register being clocked at a first preselected rate. The second register is also further adapted to be cleared or reset at the detected pulse rate and the third register being cleared at a second preselected clock rate substantially greater than the first preselected clock rate. The second register is also input-coupled to an output of the first register.

There is further provided a comparator having a first input coupled to a bias source indicative of a resolution limit associated with the pulses of the detected pulse rate, and further having a second input coupled to an output of the second clocked register. The first and third registers are commonly coupled to an output of the comparator, the output of the third register being indicative of the time rate of change of the detected pulse rate.

In normal operation of the above-described arrangement, the comparator and accumulating register cooperate in the manner of an integrator in the feedback loop of a negative feedback arrangement in response to the applied or detected variable pulse rate, whereby the output of the comparator is indicative of the first derivative or time rate of change of the applied pulse rate. For lesser pulse rates or lesser rates of change of pulse rate, the sampling period of the feedback loop is compensatorily increased so as to preserve the digital resolution of the closed loop rate differentiator at such lesser rates while incidentally changing the loop gain with changes in the applied pulse rate. The output gain of the device is compensatorily adjusted by variation of the reset rate of the third register with variation in the applied pulse rate, the third register gain tending to be varied inversely with variations in the applied pulse rate. Thus, the overall gain of the device is stabilized and the digital resolution thereof improved over a wide range of velocity-analog pulse rate inputs.

Accordingly, an object of the invention is to provide an improved digital device for determining acceleration from the time rate of change of a velocity analog pulse rate.

Another object of the invention is to provide improved digital resolution at low pulse rates in determining the time rate of change of an applied pulse rate.

Still another object is to provide compensatory clocking of a closed loop digital differentiator, so as to preserve the gain while improving the digital resolution thereof over a wide range of applied pulse rate inputs.

These and other objects of the invention will become apparent from the following description, taken together with the attached drawings, in which:

BRIEF DESCRIPTION OF THE DRAWINGS

In the figures, like reference characters refer to like parts.

DESCRIPTION OF THE PREFERRED EMBODIMENTS

Figure 1:
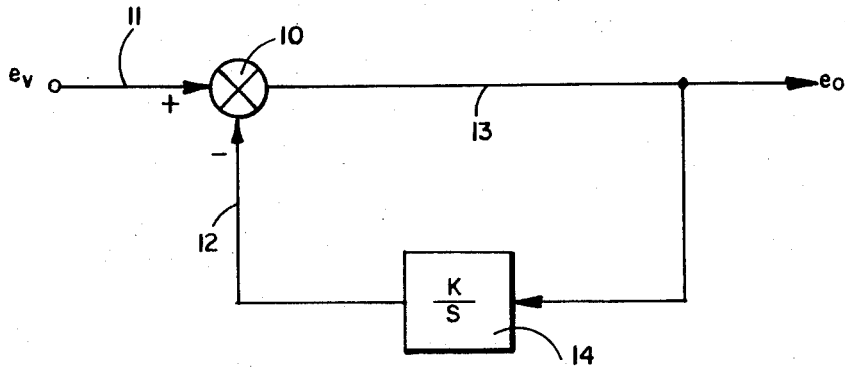
FIG. 1 is a block diagram of an integrator in closed loop arrangement for cooperation as a differentiator.

Referring now to FIG. 1, there is illustrated in block diagram form an integrator in closed loop arrangement for cooperation as a differentiator. An integrator 14 is connected in negative feedback cooperation by means of a comparator or differential signal combining means 10 having an input 12 responsively connected to an output of integrator 14 and further having an output 13 coupled to an input of integrator 14. An applied input signal $e_r$, applied to a second input 11 of comparator 10 will produce an output $e_o$ indicative of the time rate of change of input $e_r$ (assuming integrator null initial conditions of integrator 14):

$$e_o(s) = e_r(s) - e_o(s)(K/s) \quad (1)$$

collecting like terms:

$$e_o(s) [1 + (K/s)] = e_r(s) \quad (2)$$

transposing:

$$[e_o(s)]/e_r = [1/1 + (K/s)] \quad (3)$$

or where $$[e_o(s)]/e_r = (Ts/Ts+1) \quad (4)$$

From Equation (4), it is to be appreciated that the free $s$ term in the numerator describes a differentiator, while the first order term in the denominator describes a time-lag or signal smoothing element, the time constant T thereof being inversely proportional to the open loop gain of integrator 14, as well as the closed loop gain of the device varying inversely with the integrator gain K.

It is to be appreciated that in digitizing the above-described analog arrangement to handle digital data derived from pulse trains, an accumulating register may be employed as the integrator in cooperation with the digital equivalent of differential signal (by means 10). However, the digital resolution of the resultant smooth time rate of change signal $e_o$ would tend to be substantially reduced, as desired for lower pulse rate input data, over fixed data sampling periods. In other words, for fixed data sampling periods, the fewer pulses or EPUT's observed over the sampling period and upon which the resultant derivative signal $e_o$ is calculated will result in a deterioration or coarsening of the digital resolution of such result. Such resolution limit will also be effected by the time-interval or spatial resolution of the pick-off device (such as a wheel position sensor in an automotive braking system) utilized to generate the exemplary analog velocity pulse rate.

Figure 2:
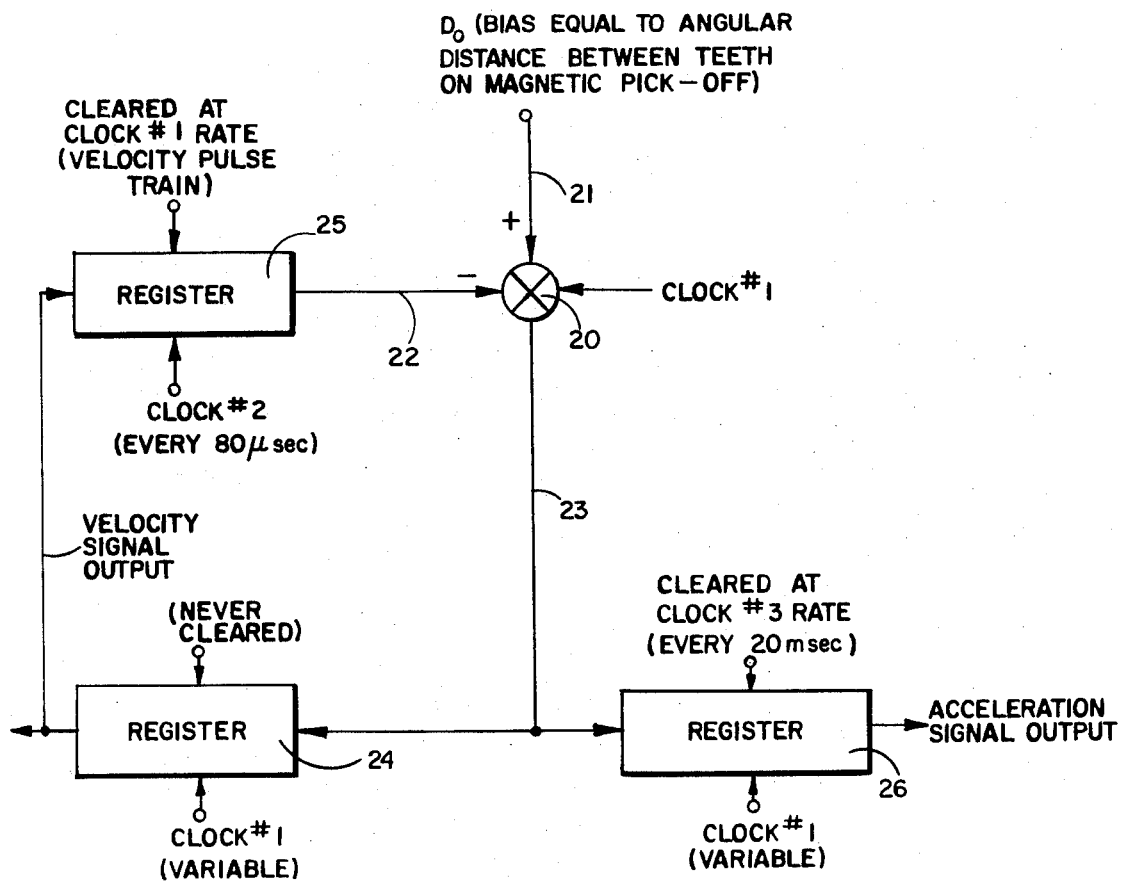
FIG. 2 is a block diagram of a system embodying the concept of the invention.

By means of the arrangement of FIG. 2, a plurality of compensatorily clocked registers may be employed to preserve the digital resolution of a digitally derived time rate of change of a pulse rate.

Referring now to FIG. 2, there is provided negative feedback pulse-rate responsive means for determining the time rate of change of a detected pulse rate and including compensatorily clocked means for preserving the digital resolution of the time-rate-of-change output signal. There is provided an accumulating register 24 having a clock input which is adapted to be clocked by the pulses of a detected pulse rate source corresponding, for example, to an analog-velocity of a braked wheel in a vehicular brake control system, and there is also provided a comparator 20 having a first input adapted to be responsive to a bias signal source $D_o$, indicative of the analog resolution limits of the pick-off or sensor employed to produce the pulse train (with associated variable pulse rate) applied to the clock input of first register 24. A second input 22 of comparator 20 is responsively coupled (by means of a second register 25) to the output of first register 24. If desired, comparator 20 may be adapted to be clocked by the above-noted detected pulse rate source. Such arrangement of elements 20 and 24 in FIG. 2 functionally correspond generally to the arrangement of elements 10 and 14 of FIG. 1.

There is also provided in FIG. 2 a clocked second register 25 interposed between the output of accumulating register 24 and the second input 22 of comparator 20, second register 24 having a clock input responsive to a preselected clock rate corresponding to a periodicity, for example, of 80 microseconds, and being further arranged to be reset or cleared in response to the detected pulse rate input. There is further provided a clocked third register 26 input-coupled to the output 23 of comparator 20, third register 26 having a clock input adapted to be responsive to the detected pulse rate and further arranged to be cleared or reset at a preselected clock rate substantially slower than the preselected clocking of second register 25 and corresponding to a periodicity, for example, of 20 milliseconds.

The construction and arrangement, including clocking (for write-in) and clearance or resetting (for read-out) of shift registers is well understood in the digital equipment art and, further, such details do not comprise novel aspects of the inventive concept. Accordingly the clocks or sources of clocking or resetting inputs have not been shown, and the registers 24, 25 and 26 have been shown in block form only for convenience in exposition. Similarly, the construction and arrangement of a comparator is well understood in the digital equipment art and, therefore, comparator 20 is also shown in FIG. 2 in block form only.

In normal operation of the above-described arrangement, the clock rate of the second register 25 is preselected to be one sixteenth the fastest or highest detected pulse rate (or reset rate) of interest in order to assure a cumulative data input thereto of adequate resolution (e.g., more than one sample over the read-out periodicity). Thus, for a detected pulse rate range of 1.2 to 20 milliseconds, one sixteenth the fastest detected pulse rate would correspond to a preselected clock rate of about 80 microseconds for register 25. The variation in the read-out periodicity for second register 25, while providing adequate data samples under both high and low detected pulse rates, provides a lower cumulative output for the lower periodicity associated with the higher detected pulse rate, as to represent a reduced gain scaling for such higher detected pulse rate.

The reset or read-out rate of third register 26 is preselected to be no faster than the slowest expected detected pulse rate (corresponding to a periodicity as long as 20 milliseconds) in order to avoid loss of such data upon read-out. Obviously, at faster detected pulse rates (corresponding to a periodicity as small as 1.2 milliseconds) an adequate cumulative number of data samples would occur as to avoid a likelihood of a loss of data. Thus, the periodic read-out of third register 26 is a cumulative quantity of the clocked inputs thereto, and is proportional to the product of the average of such clocked inputs and the clocking rate for such read-out periodicity. In other words, for an average applied input, the associated output for a given read-out period is gain-scaled in proportion to the clocking rate (e.g., the detected pulse rate) applied to the clock input of register 26 during such 20 millisecond reset interval of interest. Such proportional gain-change is thus compensatory of that inverse gain-scaling effect of second register 25 resulting from employing the periodicity of the variable detected pulse rate as the read-out periodicity therefor.

Thus, it is to be appreciated that the "granularity" or coarseness of the data result for low detected pulse rates is avoided or compensated for by means of the high speed clocking and variable pulse rate resetting of second register 25, while the variable detected pulse rate clocking and fixed rate resetting of output register 26 provides compensatory gain scaling to compensate for gain variations imparted by the cooperation of second register 25.

Another conceptual view of the arrangement of FIG. 2 is to consider second register 25 as a second integrator, whereby the feedback loop arrangement of comparator 20 comprises a tandem arrangement of two integrators (24 and 25), input 21 of comparator 20 being responsive to incremental displacements $D_o$ corresponding to the sensed displacement increment or spatial interval represented by the interval between successive ones of the detected pulses from the magnetic pick-off, say, of a wheel rotation sensor or other source of the detected pulse rate. The double-integration of such displacement increment $D_o$ in the above described feedback arrangement thus provides an output on line 23 corresponding to acceleration or the double-derivative of such displacement with respect to time:

$$D_o - [e_o(s)]/(s^2) = e_o(s) \quad (5)$$

collecting like terms:

$$D_o = e_o(s) + [e_o(s)]/(s^2) \quad (6)$$

transposing:

$$s^2 D_o(s) = s^2 e_o(s) + e_o(s) \quad (7)$$

$$s^2 D_o(s) = e_o(s)(s^2 + 1) \quad (8)$$

thus:

$$[e_o(s)]/(D_o) = (s^2)/(s^2 + 1) \quad (9)$$

From the analog expression of Equation (9), it is to be appreciated that the free $s^2$ term in the numerator describes a double differentiation, while the $(s^2+1)$ term in the denominator corresponds to an apparently undamped second order lag or signal smoothing term. Thus, where the term $D_o$ represents an incremental distance, $e_o$ represents the double-derivative thereof or acceleration. In actual operation of the digital device of FIG. 2, however, the successive resettings of second integrator 25 serve to prevent instability or otherwise damp the closed loop response of the double integrations represented by registers 24 and 25. Third register 26 serves to sample, gain-scale and further smooth the data, the smoothing period corresponding to the exemplary reset periodicity (of 20 milliseconds) and the gain-scaling corresponding to the rates of the variable clocking rate to the fixed reset rate, being compensatory of the inverse gain-scaling effect of the variable rate resetting of register 24.

Accordingly, there has been described improved digital means for effecting a smoothed indication of the time-rate of change of events-per-unit-time (EPUT), as to be also indicative of the double derivative of the spatial interval or incremental distance portrayed by the output of the EPUT sensor, the resolution of which digital output is maintained over a wide range of EPUT's or pulse rates. In other words, the output resolution of the EPUT rate differentiator tends not to deteriorate with reductions in EPUT rate.

Because of the integrating action of first register 24, it is clear that the output thereof in response to the acceleration signal on line 23 represents a velocity signal or first integral with respect to time of the acceleration input applied to register 24.

The mechanization shown in FIG. 2 is characterized by the limitation that as the detected pulse rates of clock No. 1 approach zero, the capacity of second register 25 must become inordinately large in order not to overflow. Also, the sense of the contents of the first register 24 can be driven negative by too large a correction from the output 23 of comparator 20. Further, the contents of the first register 24 may not go to zero when the detected pulse rate of clock No. 1 goes to zero because of the associated absence of clocking pulses to first register 24, which lack of clocking pulses similarly precludes third register 26 from being updated in a timely manner.

Figure 4:
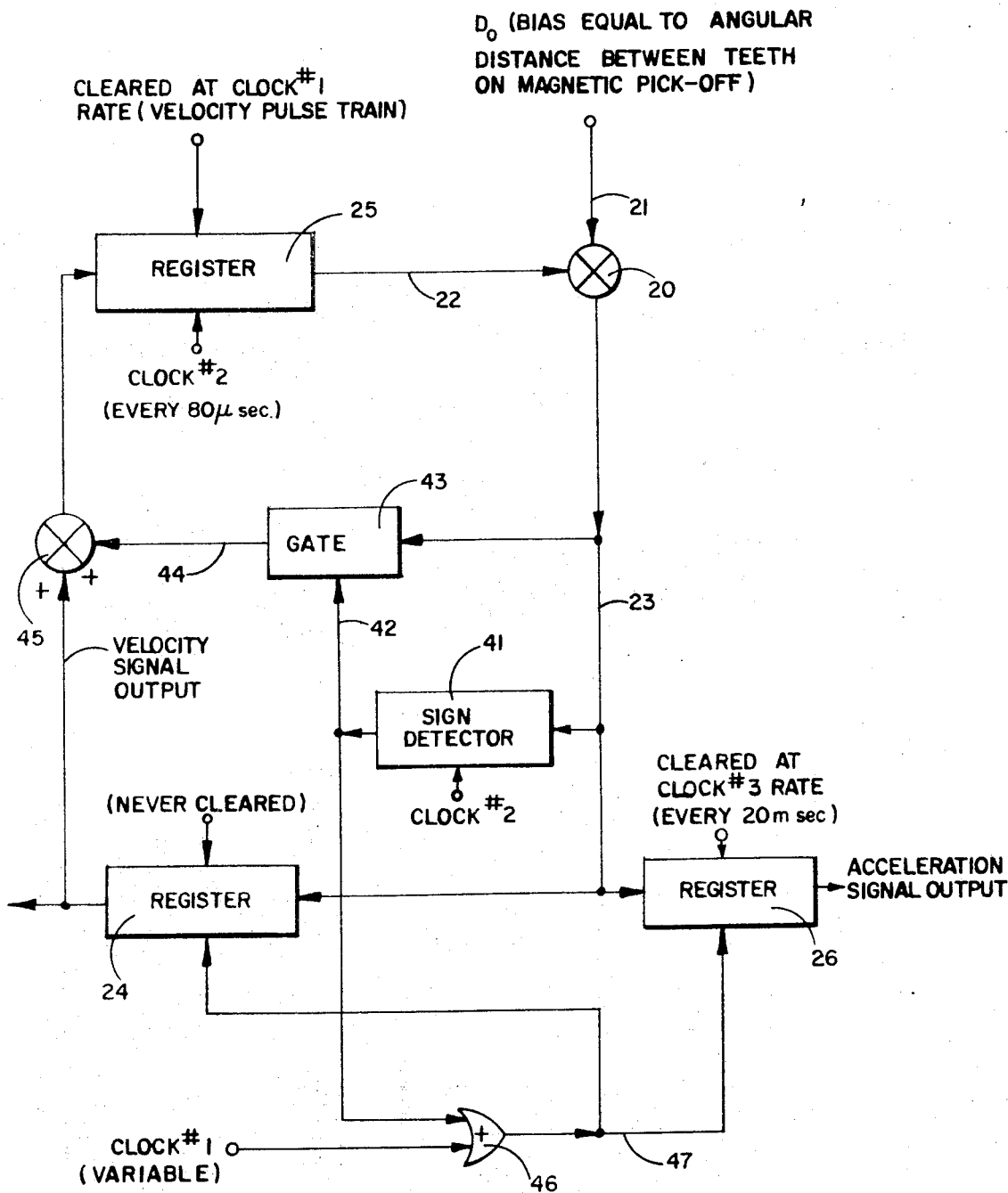

These limitations may be overcome by the exemplary addition of compensatory elements to FIG. 2 as shown in FIG. 4. Referring to FIG. 4, these compensatory elements comprise sign detector 41 (whose output 42 corresponds to clock No. 2 when the output 23 of comparator 20 is a negative number), a gate 43 (whose output 44 corresponds to the input from comparator 20 when the two-state control input from sign detector 41 is "True" or corresponds to clock No. 2 and whose output corresponds to the number zero when the control input is "False"), an adder 45 (whose output to register 25 is the algebraic sum of adder inputs from gate 43 and from register 24), and a logical OR gate 46 whose output 47 (applied to the clock inputs of register 24 and register 26) is the logical sum of the output 42 of sign detector 41 and clock No. 1.

In normal operation of such arrangement of FIG. 4 and when the detected pulse rate of clock No. 1 is increasing or remaining constant, the additional elements 41 through 47 have no effect on the operation of the digital acceleration measurement device because the output 23 of comparator 20 never becomes negative, and also because sign detector 41 is in the "False" state. However, when the output 23 of comparator 20 becomes negative as a result of a decrease in the detected pulse rate of clock No. 1, then this negative signal is applied to register 24 and register 26 by the "True" state of the output of sign detector 41, thus decreasing the velocity contents of register 24 and similarly decreasing the acceleration contents of register 26 prior to the arrival of the next pulse of clock No. 1. Further, the contents of register 25 are decreased by the application of the clock No. 2-responsive, gated output 23 of comparator 20 to the input of adder 45. Such applied input to adder 45 cancels the correction signal from the output 23 of comparator 20 which is simultaneously being applied to register 24 and register 26.

Additionally, when the detected pulse rate of clock No. 1 goes to zero, the additional elements 41 through 47 provide means for reducing the velocity contents of register 24 to zero in a manner which precludes the said register from becoming negative.

Thus, by means of the detailed arrangement of FIG. 4, the necessity of an inordinately large capacity for register 25 is avoided and the low-speed performance of the device of FIG. 2 is enhanced.

Figure 3:
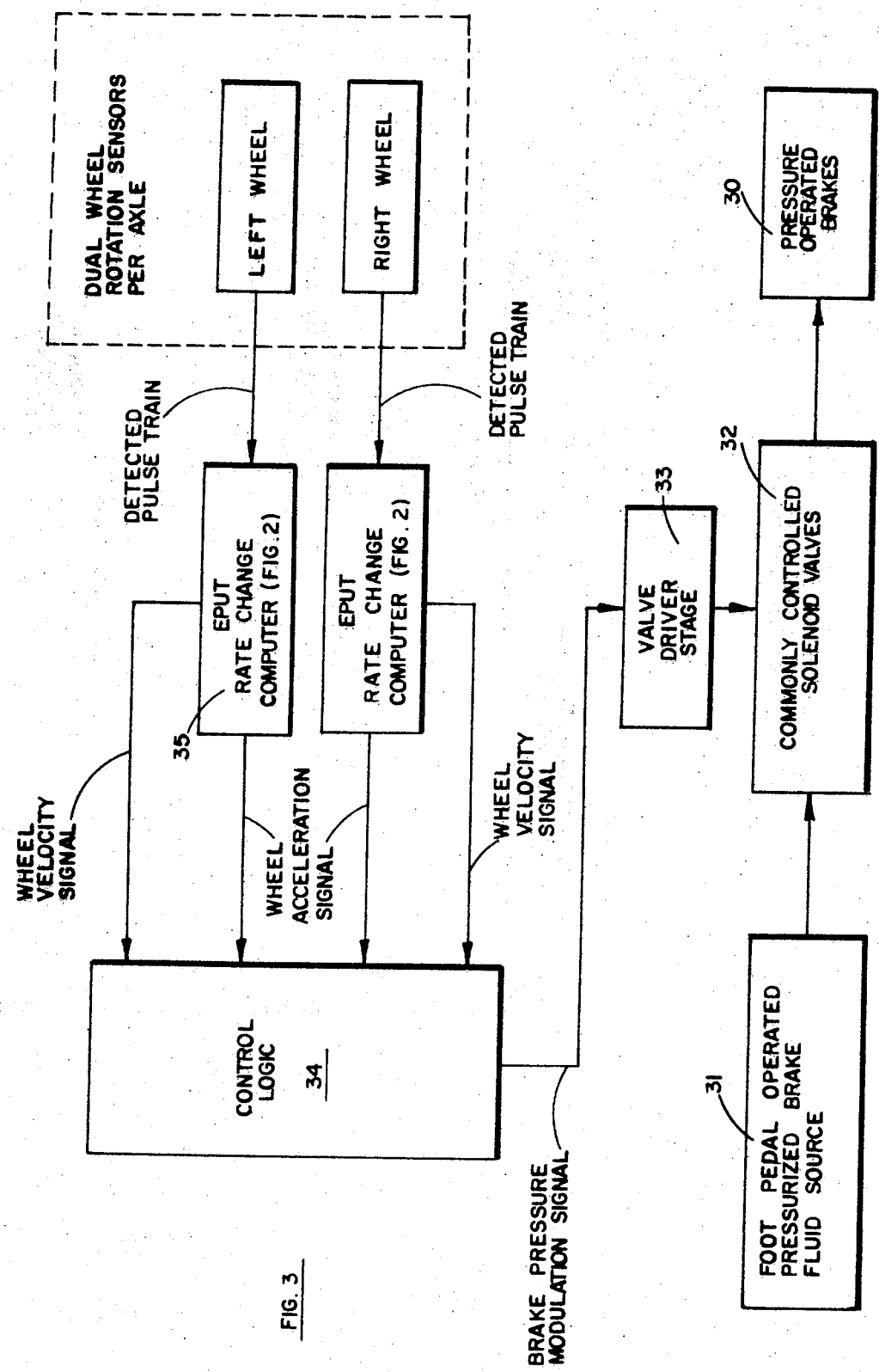
FIG. 3 is a block diagram of an exemplary system in which the arrangement of FIG. 2 may be advantageously employed.

An exemplary application of the EPUT rate change computer or detected pulse rate differentiator as a wheel rotational acceleration computer in an anti-skid brake control system is shown in FIG. 3.

Referring to FIG. 3, there is schematically illustrated a set 30 of pressure-operated brakes responsive to a foot-pedal operated pressurized brake fluid source 31. Such source may be either pneumatic or hydraulic. Interposed between the output of pressurized source 31 and brakes 30 are solenoid valve means 32 for modulating or selectively throttling the fluid pressure applied by foot pedal operation. Such selective throttling or modulation (for relief of brake fluid pressure) is effected by control signals applied to the solenoid valves by a valve driver stage 33 in response to the operation of control logic means 34, as a preselected logic function of brake wheel rotational velocity and acceleration state data. Such data is derived from wheel rotation, or motion, sensors such as magnetic pick-offs or other devices known in the art for providing a pulse train indicative of wheel rotation, the pulse rate being indicative of rotational velocity and the rate of change of the pulse rate being indicative of rotational acceleration. A pulse train may be detected for each of the left and right wheels of a braked wheel pair of an axle. The wheel speed and acceleration signals for each of the two wheels of each axle may be determined by an event-per-unit-time (EPUT) rate change computer 34 corresponding to the arrangement of FIG. 2.

Although the concept of the invention has been described alternatively in terms of a smoothed differentiator of rotational velocity as measured by a detected pulse rate and as a smoothed double differentiator of incremental rotational displacement, the concept of the invention is not so limited. It is clear that the EPUT rate may be selected to represent the time rate of any measurable parameter of interest and the increment $D_0$ may represent any spatial interval or sampled increment of a measurable parameter of interest. Thus, although the device has been taught as being useful in an anti-skid brake control system for the measurement of braked wheel acceleration, it is to be appreciated that the device is of substantial utility in a variety of process control applications.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Negative feedback pulse rate responsive means for determining the rate of change of a detected pulse rate comprising in combination
   a clocked accumulating register having a clock input adapted to be responsive to an applied variable-rate pulse input,
   comparator means having a first input responsive to a preselected parametric interval represented by the periodicity of said detected pulse rate and also having a second input responsively coupled to an output of said accumulating register, and further having an output drivingly coupled to an input of said register, said output of said comparator means providing a signal indicative of the time-rate of change of the pulse rate of said applied pulse rate.

2. The device of claim 1 in which there is further provided compensatorily clocked means for preserving the digital resolution of said acceleration indicative output signal over a wide range of pulse rate input conditions, in which a clock input of said accumulating register is responsive to said detected pulse rate and in which a counting input of said accumulating register is input coupled to the output of said comparator.

3. The device of claim 2 in which said comparator has a third input responsive to a bias source indicative of an analog resolution limit associated with the pulses of said detected pulse rate, a clocked second register interposed between an output of said first register and the associated input to said comparator, said clocked second register being clocked at a preselected clock rate and cleared at said detected pulse rate.

4. The device of claim 3 in which there is further provided a third clocked register interposed at the acceleration signalling output of said comparator and clocked at said detected pulse rate and cleared at a preselected rate substantially less than said preselected clock rate of said second register.

5. The device of claim 2 in which said compensatorily clocked means comprises
   a clocked second register interposed between said output of said accumulating register and said second input of said comparator, said second register being input coupled to said accumulating register; and
   a clocked third register input coupled to said output of said comparator,
   said third register being clocked and said second register being reset commonly at said detected pulse rate, said second register being clocked and said third register being reset at mutually exclusive preselected clock rates.

6. The device of claim 2 in which said compensatorily clocked means comprises
   a clocked second register interposed between said output of said accumulating register and said second input of said comparator, said second register being input coupled to said accumulating register; and
   a clocked third register input coupled to said output of said comparator
   said second register being clocked at a preselected rate and being reset at said detected pulse rate,
   said third register being clocked at said detected pulse rate and being reset at a second preselected clock rate substantially less than the first preselected clocked rate of said second register.

7. Pulse rate responsive means for determining the rate of change of a detected pulse rate comprising in combination
- a clocked first register 24 having a clock input adapted to be responsive to said detected pulse rate;
- a clocked second register 25 having a clock input responsive to a first preselected periodic clock source and further having a clearance input adapted to be responsive to said detected pulse rate and a counting input responsive to an output of said first register;
- a bias signal source $D_o$ representing a detector resolution limit in the detection of said detected pulse rate;
- a clocked comparator 20 responsive to the output of said source and said clocked second register for providing a signal indicative of the difference therebetween, a clocking input of said comparator adapted to be responsive to said detected pulse rate;
- a clocked third register 26 having a clock input adapted to be responsive to said detected pulse rate, said clocked first and third registers 24 and 26 being commonly responsive to said difference signal response of said comparator, said clocked third register 26 being cleared in response to a second preselected periodic clock source having a clock rate substantially less than said first clock source and providing an output indicative of said rate of change of said detected pulse rate.

8. Pulse rate responsive means for determining the rate of change of a detected pulse rate comprising in combination
- a first, second and third clocked register
  - said first and third registers being commonly adapted to be clocked by said detected pulse rate, and said second register being clocked at a first preselected clock rate,
  - said second register being adapted to be cleared at said detected pulse rate and said third register being cleared at a second preselected clock rate substantially less than said first preselected clock rate,
  - said second register being input-coupled to an output of said first register; and
- a clocked comparator having a first input coupled to a bias source indicative of an analog resolution limit associated with the pulses of such detected pulse rate, and further having both a second input coupled to an output of said second clocked register and a clock input adapted to be responsive to said detected pulse rate, said first and third registers being commonly input-coupled to an output of said comparator;
- the output of said third register being indicative of said rate of change of said detected pulse rate.

9. In an anti-skid brake control system for wheeled vehicles and responsive to braked wheel velocity and acceleration and having means for providing a detected pulse train indicative of wheel rotation, pulse rate responsive means for determining the rate of change of a detected pulse rate of said pulse train comprising in combination
- a first, second and third clocked register
  - said first and third registers being commonly adapted to be clocked by said detected pulse rate, and said third register being clocked at a first preselected clock rate,
  - said second register being adapted to be cleared at said detected pulse rate and said third register being cleared at a second preselected clock rate substantially greater than said first preselected clock rate,
  - said second register being input-coupled to an output of said first register; and
- a clocked comparator having a first input coupled to a bias source indicative of an analog resolution limit associated with the pulses of such detected pulse rate, and further having both a second input coupled to an output of said second clocked register and a clock input adapted to be responsive to said detected pulse rate, said first and third registers being commonly input-coupled to an output of said comparator;
- the output of said third register being indicative of said rate of change of said detected pulse rate.

* * * * *